United States Patent
Strumolo et al.

(10) Patent No.: US 6,263,300 B1
(45) Date of Patent: Jul. 17, 2001

(54) PARTICLE TRAJECTORY ANALYSIS SYSTEM AND METHOD FOR VEHICLE DESIGN

(75) Inventors: Gary Steven Strumolo, Beverly Hills; Viswanathan Babu, Farmington Hills, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/175,091

(22) Filed: Oct. 19, 1998

(51) Int. Cl.$^7$ ..................................... G06G 7/48
(52) U.S. Cl. .................... 703/8; 703/6; 703/7; 703/9; 703/12
(58) Field of Search .................. 703/8, 7, 9, 6, 703/12; 706/17

(56) References Cited

U.S. PATENT DOCUMENTS

| | | | |
|---|---|---|---|
| 4,809,202 | * 2/1989 | Wolfram | 703/9 |
| 5,432,718 | * 7/1995 | Molvig et al. | 703/6 |
| 5,455,780 | 10/1995 | Nguyen et al. | |
| 5,537,641 | 7/1996 | da Vitoria Lobo et al. | |
| 5,594,671 | * 1/1997 | Chen et al. | 703/6 |
| 5,640,335 | 6/1997 | Molvig et al. | |
| 5,649,064 | * 7/1997 | Jorgensen et al. | 706/17 |
| 5,751,607 | 5/1998 | Ohta | |
| 5,921,780 | * 7/1999 | Myers | 703/8 |
| 5,940,309 | * 8/1999 | White et al. | 703/7 |
| 6,056,781 | * 5/2000 | Wassick et al. | 703/12 |

FOREIGN PATENT DOCUMENTS

0837408 A2   4/1998   (EP).

OTHER PUBLICATIONS

Web article, "CFD Solutions for Automotive Design", 1997, Fluent, Inc. http://www.fluent.com/solutions/automotive/applications.html.*

Ghannam, M, et al, "A model for automotive windshield washer spray delivered by a fluidic nozzle", IMechE D, Journal of Automotile Engineering, vol. 210, pp. 327–333, 1996.*

Web article, "Atomization and Spray Technology", as last modified Sep. 9, 1998, ICPET, http://www.icpet.nrc.ca/projects/atom_e.html.*

Web article "CFD Solutions for Automotive Design" 1997, Fluent Inc. http://www.fluent.com/applicat/auto/examples/auto.htm.

Fluidex abstract 0379502 & Proceedings ImechE D, Journal of Automotive Engineering, 210 D4/—(327–333), 1996, Ghannam M and Schumack M, "A model for automotive windshield washer spray delivered by a fluidic nozzle".

"Atomization and spray technology", as last modified Sep. 9, 1998, at www.icpet.nrc.ca/projects/atom_e.html.

* cited by examiner

Primary Examiner—Kevin J. Teska
Assistant Examiner—Jibreel Speight
(74) Attorney, Agent, or Firm—David B. Kelley (57) ABSTRACT

The method and system for aiding in the design of an automotive vehicle enables dynamic placement of particle injection points into a flow domain to permit visual observation and alteration of resulting particle trajectories with respect to a computer aided design model representative of the vehicle. Various particle trajectories, representing windshield washer spray, water droplets along the vehicle surface, and the like can be simulated relative to the vehicle surface with or without the influence of a flow field around the vehicle surface to evaluate a vehicle design, compare alternate designs and compare results from physical aerodynamic tests to predicted results.

4 Claims, 10 Drawing Sheets

PARTICLE TRAJECTORY ANALYSIS SYSTEM AND METHOD FOR VEHICLE DESIGN

FIELD OF THE INVENTION

The present invention relates to computer aided vehicle design in general, and more specifically to a particle trajectory analysis system for computer aided vehicle design.

BACKGROUND OF THE INVENTION

There are numerous computer related tools which can facilitate the design and testing of automotive vehicles, including generalized software programs such as computer aided engineering (CAE), computer aided design (CAD), and computational fluid dynamics (CFD). These tools are typically used to investigate many issues related to vehicle design, including vehicle durability, vehicle performance, and vehicle aerodynamics. Heretofore, limitations on computer speed and algorithm accuracy have inhibited the development of a particle trajectory analysis tool in which several exterior aerodynamic design issues can be studied. For example, while the depression of the windshield washer spray at high vehicle speeds is a well-known problem, currently there are no predictive CAE tools to analyze this extremely complex phenomenon, which involves the breakup of a liquid jet into droplets, the interaction between the droplets and the external three-dimensional flow field, inertia and gravity effects, and surface tension effects. A major obstacle in the past in investigating this, as well as other exterior aerodynamic issues, has been the inability to accurately calculate an external flow field around the vehicle.

However, with the advent of new and improved CFD technology, an accurate external flow field can now be calculated, thus making a particle trajectory analysis tool technically possible. A further need exists, nonetheless, for a method and system which utilizes available computer related technology to provide a user accessible particle trajectory analysis tool to aid in vehicle design. Additionally, a method and system is needed to provide a comparison between results from physical aerodynamic tests and a particle trajectory analysis tool, and to compare alternate vehicle designs.

SUMMARY OF THE INVENTION

The present invention addresses the deficiency in the field by providing a method and system for aiding in vehicle design by enabling dynamic placement of an array of particle injection points into a flow domain to permit visual observation and alteration of resulting particle trajectories under a computed flow solution. The method and system may be used, for example, to determine wiper spray trajectories and windshield impact at highway speed and parked, water droplet trajectories on window surfaces, paint particles from spray guns, soil deposition along the bottom of vehicles, as well as other flows that involve particle trajectories to aid in vehicle design.

The system of the present invention preferably comprises particle injector placement code operable with the user input means, such as a mouse, to effect a desired placement of at least one particle injector on the display with respect to a desired portion of a CAD model of the vehicle. Trajectory determination code means are included for computing at least one trajectory for a particle stream emanating from the at least one particle injector relative to the desired portion of the CAD model for a predetermined set of particle characteristics in a predetermined set of particle external conditions. The system also includes trajectory display code means for affecting display of the at least one trajectory with respect to the desired portion of the CAD model.

A method of the present invention comprises the steps of preparing a CAD model of the desired portion of the vehicle, placing a particle injector at a desired location with respect to the desired portion of the vehicle, specifying a set of particle information describing particles to be ejected from the particle injector, computing a stationary trajectory for a particle stream emanating from the particle injector, displaying the stationary trajectory relative to the desired portion of the vehicle on a display means to permit visual observation thereof, and repositioning the particle injector if necessary to achieve a desired stationary trajectory. In one embodiment, the particle injector is a windshield washer spray nozzle, and the method further includes the steps of creating a computational mesh over the desired portion of the vehicle designed from the CAD model, computing a transient flow field over the desired portion using the computational mesh, computing a depressed trajectory for a particle stream emanating from the particle injector due to the transient flow field, and displaying the stationary trajectory and the depressed trajectory on the display means to permit visual observation of resulting particle trajectories under a computed flow solution over the desired portion of the CAD model.

An advantage of the present invention is a method and system which permits modification of vehicle design based upon computed particle trajectories with respect to a CAD model of the vehicle.

Another advantage of the present invention is a method and system for aiding in vehicle design by enabling dynamic placement of particle injection points into a flow domain to permit visual observation and alteration of resulting particle trajectories with respect to a CAD model representative of the vehicle.

Still another advantage of the method and system of the present invention is a software program which allows a user to specify various characteristics of a wiper spray nozzle including visually placing it near the hood of a vehicle, prescribing droplet size and density, injection angle and velocity, and then computing and displaying spray trajectories which result under both parked and driving conditions.

Still yet another advantage of the present invention is a method and system for analyzing windshield wiper spray depression at highway speeds.

Another advantage is a software program for evaluating hood design and windshield washer spray nozzle placement relative to a vehicle design.

Yet another advantage of the present invention is a method and system which provides a software program which can predict streaking along the bottom sides of a vehicle design caused by soil thrown from the tires.

Yes still another advantage is a software program which can predict soil deposition patterns from a vehicle tire and evaluate modifications to a vehicle design to minimize such streak patterns.

Yet another advantage of the present invention is a method and system providing a software program to simulate movement of water droplets along a vehicle surface, such as along a windshield or side glass to aid in modifications to vehicle design in order to achieve a desired water management goal.

A further advantage is a software program which permits visual observation of both stream lines and water droplet trajectories along a vehicle surface.

In a preferred embodiment, the present invention includes arithmatic logic circuit configured to retrieve information from a specific file, display that information in a form of a vehicle design on a display screen, compute particle trajectories relative to the vehicle design based on specific input, display the trajectories relative to the vehicle design, and allow the user to modify the specific input in order to produce trajectories which meet the desired design criteria.

BRIEF DESCRIPTION OF THE DRAWINGS

These and other objects, advantages, and features of the present invention will be apparent to those skilled in the art upon reading the following description with reference to the accompanying drawings, in which.

DETAILED DESCRIPTION OF THE PREFERRED EMBODIMENT

Figure 1:
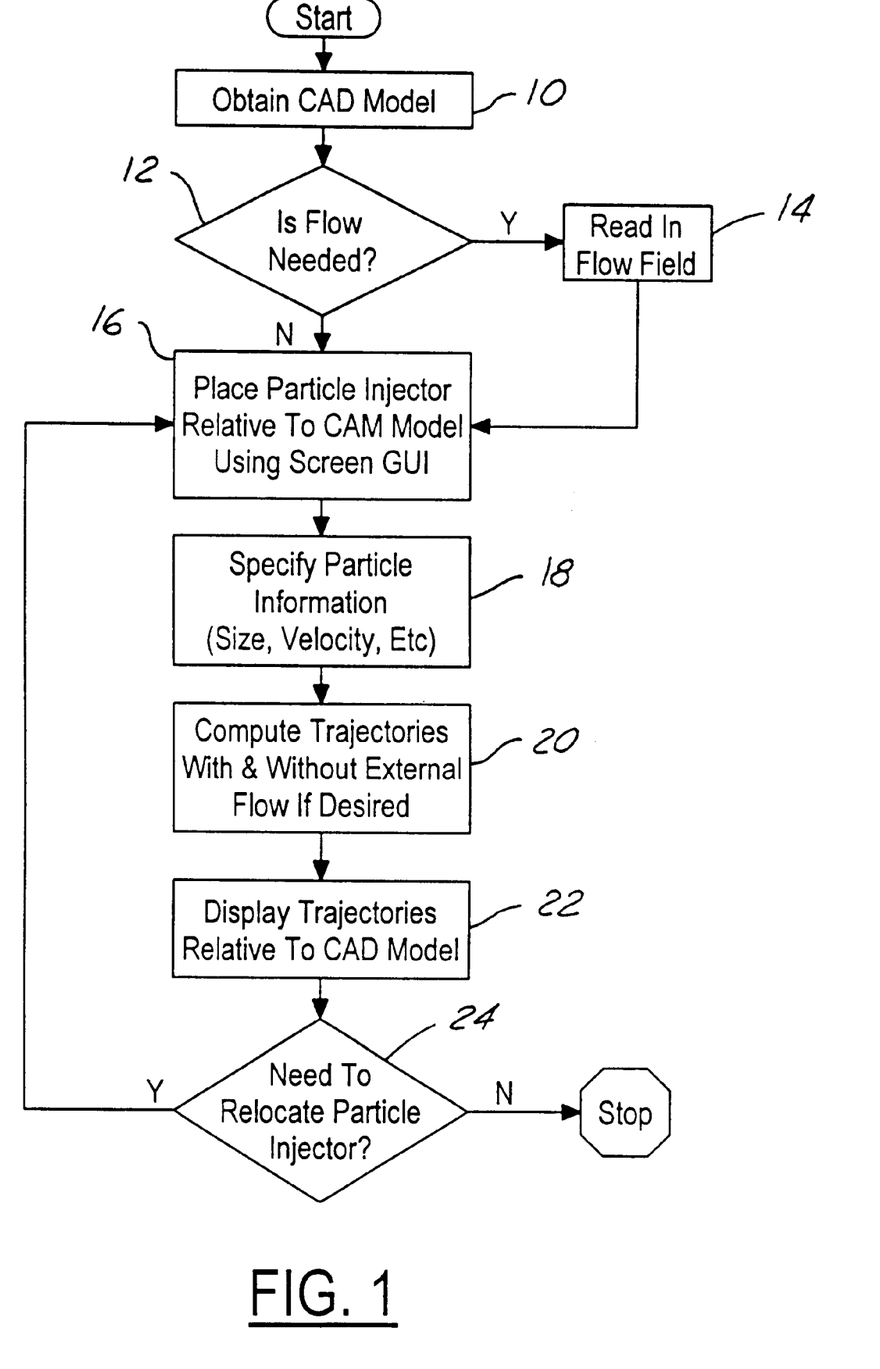
FIG. 1 is a flowchart of a method to aid in designing an automotive vehicle using particle trajectory analysis according to the present invention.

Turning now to the drawings, and in particular to FIG. 1 thereof, a flow chart of the method of the present invention is shown to aid in designing an automotive vehicle using particle trajectory analysis by enabling dynamic placement of particle injection points relative to a computer aided design (CAD) model representative of a portion of a vehicle with and without an external flow thereover. The present invention is intended to be carried out on a computer system which includes a computer having a memory, a processor, a display means, and user input means, such as a mouse or keyboard, as further described below. In box 10 of FIG. 1, a CAD model of a vehicle, or a desired portion of a vehicle, is obtained from an electronic storage device, such as a computer file stored on a server memory, the memory of the computer, a magnetic disk storage device, or any one of numerous other electronic or magnetic storage devices. The CAD model is preferably displayed, as is known in the art, on the display means, which can be, for example, a video display screen. Next, in diamond 12, an option is given to use a computed external flow over the CAD model, for example, representative of vehicle aerodynamics due to movement through the ambient. If flow is desired, then a predetermined flow field is read in from an external source, for example, a stored computer file, as shown in box 14. The external flow field may be computed by various commercial software programs, for example, PowerFlow™. This external flow field is computed relative to the exterior surface of the CAD model obtained in box 10.

If it is determined that flow is not needed in diamond 12, flow is routed to box 16 where a simulated particle injector is placed relative to the CAD model, box 16 (FIG. 1), to which the method is routed after reading in the flow field from box 14. The particle injector is preferably located using an on-screen graphical user interface (GUI), in cooperation with the user input means, preferably a mouse device known in the art. The screen GUI and mouse device permit a user to easily and dynamically place the particle injector at a desired location relation to the CAD model. It should be understood that more than one particle injector may be located relative to the CAD model and that particle trajectories emanating therefrom may be calculated and simultaneously displayed, as further discussed below.

In box 18, information is specified about the particles which are simulated to be ejected from the particle injector. This information may include, for example, particle size, particle velocity exiting the particle injector, particle density, and other information describing particle characteristics (FIG. 1). It should be understood that the particle information of box 18 need not be input in the order shown in FIG. 1 but may be provided at any step of the method prior to computation of particle trajectories in box 20. The trajectories are computed according to known physical principles as further described below, and may be computed with or without the external flow field (box 20).

After the particle trajectories have been computed, they are displayed relative to the CAD model (box 22, FIG. 1). Various options for display of the particle trajectories may be chosen, as further described below, and an on-screen GUI may be used to ease user selection from among the display options.

Finally, the user is given an option to dynamically relocate the particle injector, preferably using the screen GUI, in order to assess the performance of a new vehicle design, or to compare alternate vehicle designs, or to compare results from physical aerodynamic tests and a particular vehicle design (box 24, FIG. 1).

In the present invention, the trajectories of particles of a given diameter and given initial velocity can be predicted (box 20, FIG. 1) as they move through a three-dimensional (3D) flow field under the influence of aerodynamic drag, inertia and gravity forces. The particles may be liquid droplets, paint droplets, solid stone representations, or other physical representations. An equation governing the trajectory of a particle of mass m, in a flow field and in the presence of gravity, g, is given by $$mX''=mg-½\rho A\ C_d|X'-V|(X'-V) \qquad (1)$$

where X is distance, the primes indicate derivative of the distance with respect to time, e.g., X' is velocity and X" is acceleration, V is the velocity of the flow field, and the underbar denotes a vector quantity. Also, ρ is the density of air, A is the cross-sectional area of a particle which preferably is modeled as a sphere, and $C_d$ is the coefficient of drag. The details of the breakup of the liquid jet into droplets and surface tension effects are not included in the equation (1) as negligible, but those skilled in the art will understand that such may be included if desired. If these particles are assumed to be spherical droplets with mass density $\rho_{liquid}$ and diameter d, we can rewrite the above equation as follows:

$$X''=g-\lambda(X'-V) \qquad (2)$$

where $\lambda=\frac{3}{4} C_d|X'-V|/(\rho_{liquid}\, d)$. The coefficient of drag varies depending on the relative velocity of the droplet with respect to the flow field velocity vector, V. This relative velocity is simply the vector X'−V. Accurate experimental data on the drag coefficient of spheres for a wide range of Reynolds numbers is known, and preferably a lookup table from these experimental values is constructed and the method and system of the present invention calculates the drag coefficient at each timestep from this table, with the Reynolds number based on the relative velocity. Given an initial location in the flow field and a velocity thereat, equation (2) can be integrated, preferably using a 4th order Runge-Kutta scheme, to obtain a particle trajectory. The initial location is specified in box 16 of FIG. 1 by locating the particle injector, and the initial velocity is specified in box 18. Other trajectory computations can be used to obtain the particle trajectories of the present invention.

Turning now to FIG. 2, a method according to the present invention for enabling dynamic placement of a windshield washer spray nozzle relative to a CAD design model representative of a desired portion of a vehicle to permit visual observation of a spray trajectories with respect to the CAD model, with or without an external flow thereover, is shown. In box 30, a CAD model of a vehicle is obtained as described above, which is preferably rendered on a display screen such as that seen in FIG. 3. The CAD model 100 (FIG. 3) may include the whole vehicle or a desired portion thereof. Next, in box 32 of FIG. 2, a flow field around the external surface of the CAD model is read in for the specified CAD model. The flow field is preferably pre-computed based upon information supplied by a user regarding the particular vehicle CAD model and other external conditions affecting an external flow therearound. Typically, flow field data external to the vehicle is computed by a CFD program, as described above, and such information is saved to a computer file for later use with the method and system of the present invention.

After reading in the flow field, a rectangular box 102 may appear in the render window (FIG. 3). The box 102 shows a region in which flow field data is available. If desired, a user can crop this box, as well as sub-sample in it, to select only a subset of the data for the windshield washer spray nozzle application, for example, by using vertical sliders 106 in a cropping/sub-sampling window 108 (FIG. 4). Such allows a reduction of the computer memory requirements in a computer system and potentially enables the method and system to run faster. Additionally, a two-dimensional slice of the external flow field can be displayed, as indicated by vectors 110 in FIG. 5, by selecting such in a velocity vector's window 112 (FIG. 6). A slice direction can be chosen to be along any one of the coordinate axes by selecting the appropriate button (X slice, Y slice, Z slice) and the magnitude of the velocity ectors can be controlled through a vertical slider 114 (FIG. 6).

Returning to FIG. 2, various information required for computing a spray rajectory is input in boxes 34 and 36. In box 34, a spray nozzle is located on the hood of the CAD model. Such placement can be accomplished using a screen GUI but also can be place by using dials 116, 118, 120, for the X, Y and Z coordinates, respectively, in the main dialogue window 120 (FIG. 7). The spray nozzle is displayed in the render window 122 as a wedge 124 (FIG. 8). In box 36 of FIG. 2, various spray information is specified. Such information is specified through the main dialogue window 121, for example, by typing in the desired droplet diameter to box 126 and by typing the droplet mass density into box 128. In addition, the inclination angle of the spray nozzle, that is the angle of the spray measured from the horizontal, and the base angle, that is the angle of rotation of the spray about a vertical axis, can be specified by using the sliders 130, 132, respectively, in the dialogue box 121 (FIG. 7). The trajectory of a single particle may be examined, as can the trajectories of multiple particles in the form of a spray. The number of particles and the spray angle may be input using box 134 and slider 136, respectively, in the main dialogue window 131. The spray injector 24 may be dynamically altered in position, slope and inclination to reflect current user selections and to provide a visual aid for assessing resulting trajectories. After the spray nozzle has been positioned to a user satisfaction, trajectory calculations, both with and without external flow, are performed (box 38, FIG. 2) by pressing a start button 138 in the main dialogue box 121 (FIG. 7). A user may select various trajectories to be rendered, including those corresponding to a vehicle moving with the speed prescribed in calculating the flow field (button 140, FIG. 7) which renders trajectories 142 (FIG. 8). Trajectories corresponding to windshield washer spray when the vehicle is parked, shown as trajectories 144 (FIG. 8) can also be rendered. Trajectories 142, 144 are affected by droplet size and selected by the user. Flow stream lines which are not affected by droplet size and which correspond to trajectories of massless particles, can also be rendered. These individual tracks can be displayed or hidden through the use of a "show/hide" button 146 in the main dialogue box 121 (FIG. 7). The stream lines for the vehicle parked situation may be selected by button 148, and the stream lines may be selected by button 150, both on the main dialogue screen 121.

In addition to the actual trajectories, a point of impingement of the particles on the windshield is also of interest, for example, to determine whether washer spray is hitting the windshield in the A, B or C zones. These impingement points can be identified by visually identifying the point of intersection between a trajectory and the windshield and clicking with the left mouse button on that point in the render window (FIG. 8). The coordinates of the impingement spots can then be displayed in a spots window (FIG. 9), and the points can be displayed as a colored spot for easy visual identification. In addition, the spots can be erased one at a time or all at once by clicking the erase spot button 152 or the Clear-All Spots button 154, respectively (FIG. 9).

Figure 2:
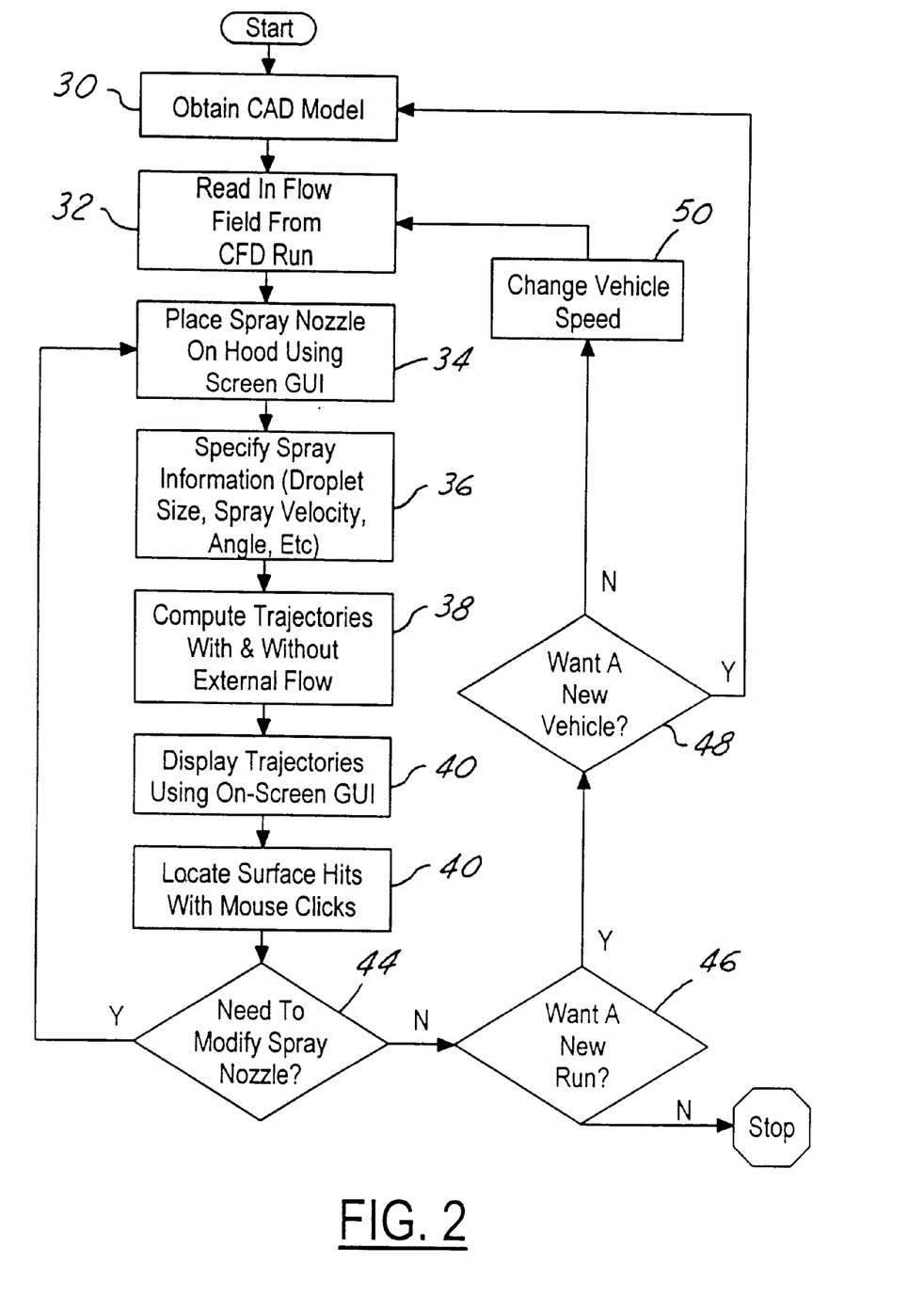
FIG. 2 is a flowchart of a method to aid in designing an automotive vehicle using particle trajectory analysis to determine a windshield washer fluid trajectory and impact location according to a first embodiment of the present invention.
Figure 3:
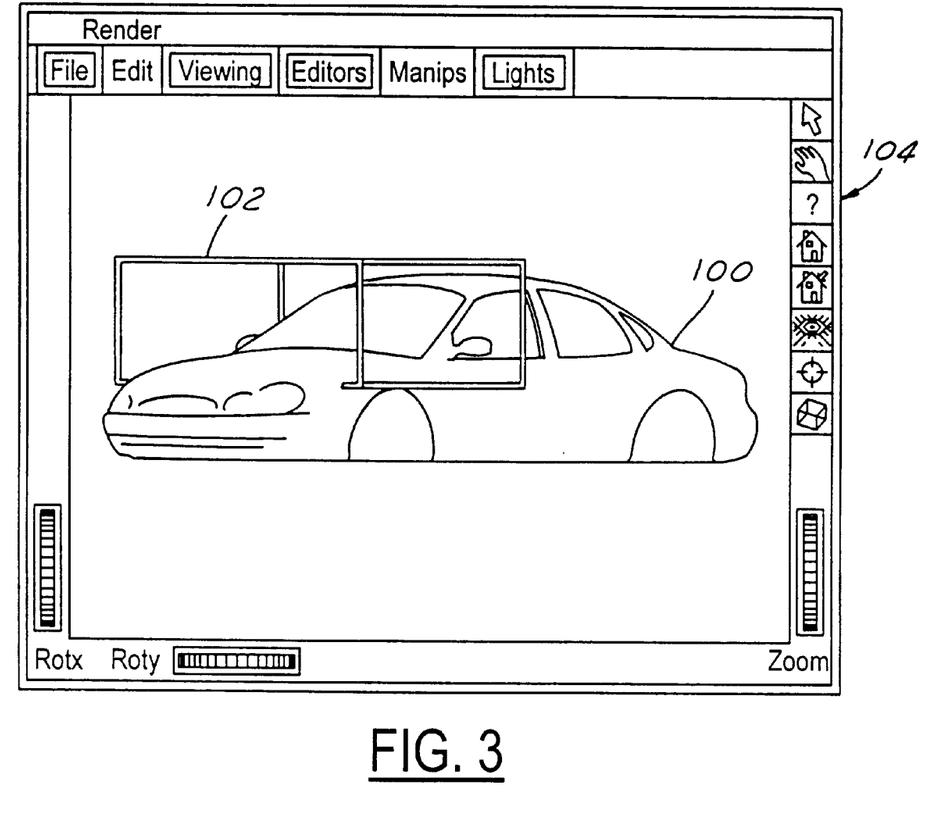
FIG. 3 is a screen perspective view of a CAD model of a portion of an automotive vehicle.
Figure 4:
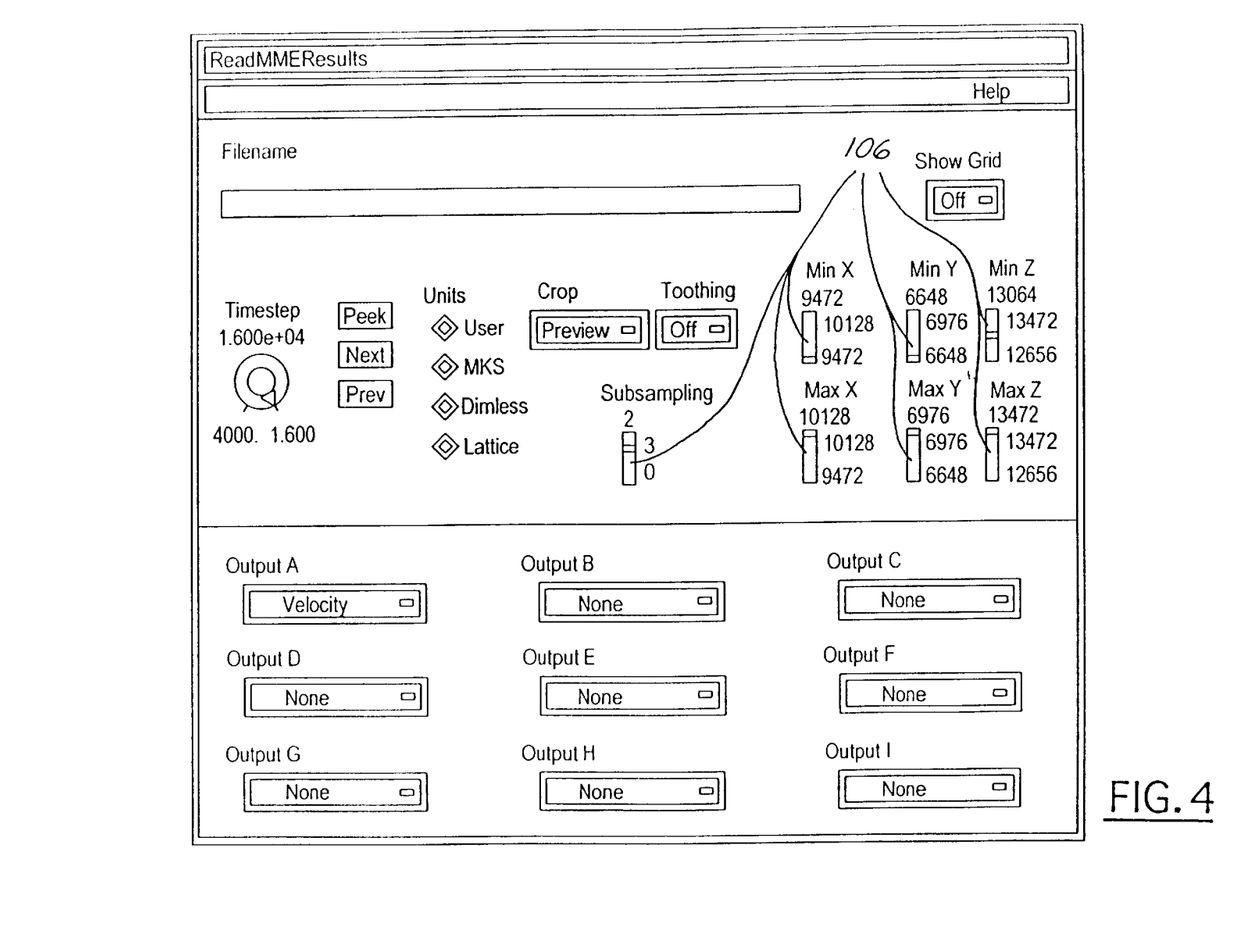
FIG. 4 is a screen view showing cropping and sub-sampling controls for use with the first embodiment of the method and system of the present invention.
Figure 5:
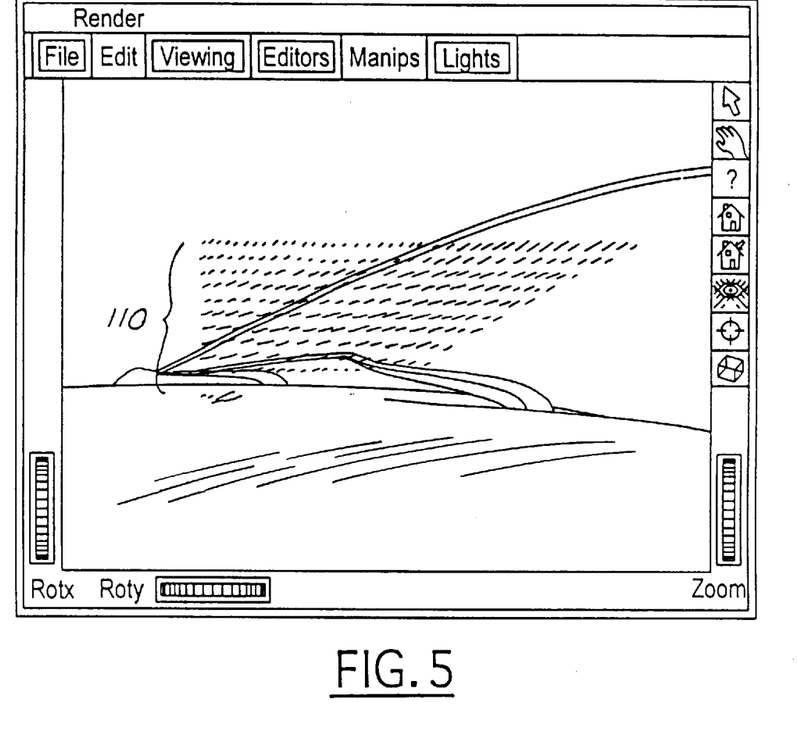
FIG. 5 is a screen view showing velocity vectors along a vertical slice of a flow field over a windshield portion of the CAD vehicle model.
Figure 6:
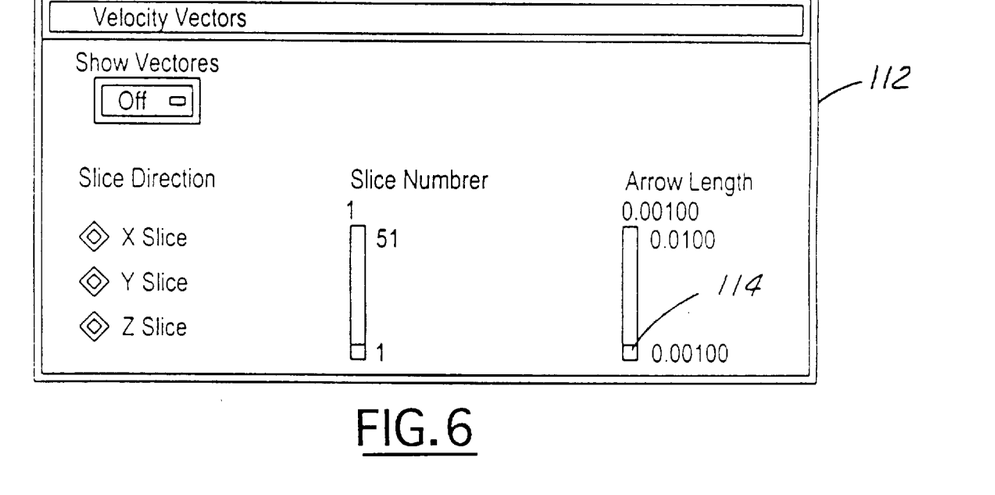
FIG. 6 is a screen view showing velocity vector selection for the present invention.
Figure 7:
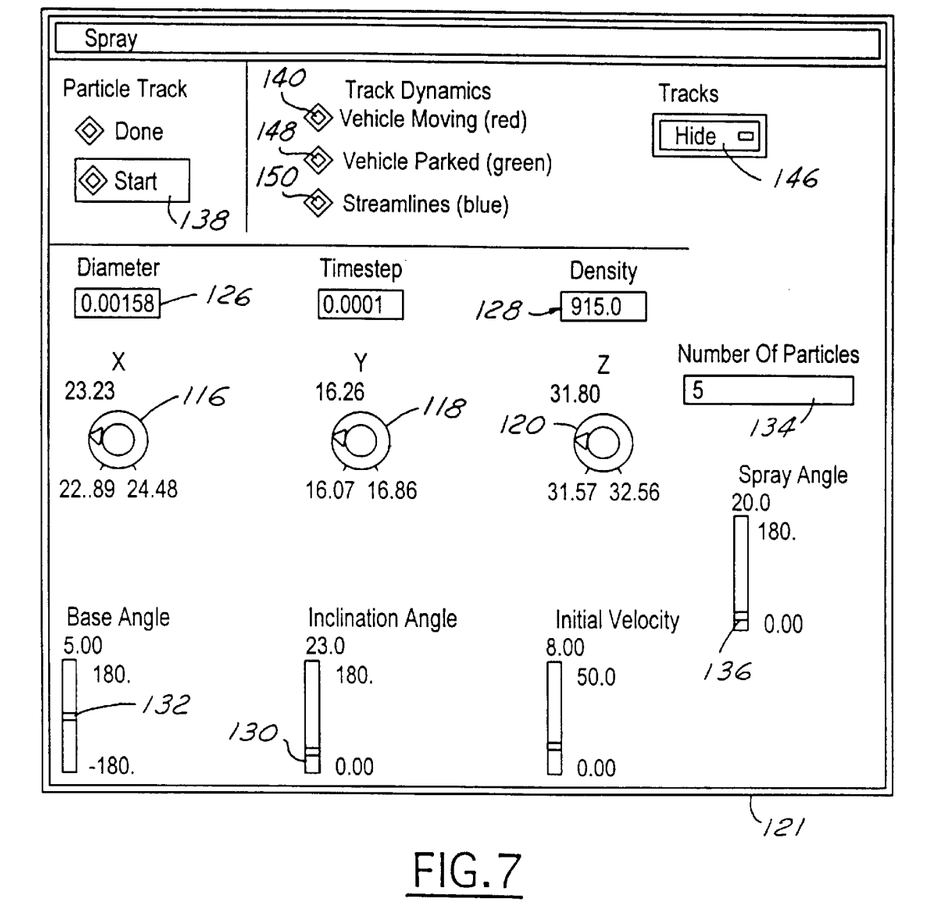
FIG. 7 is a screen view of a dialog window for selecting windshield washer spray information to be used in the present invention.
Figure 8:
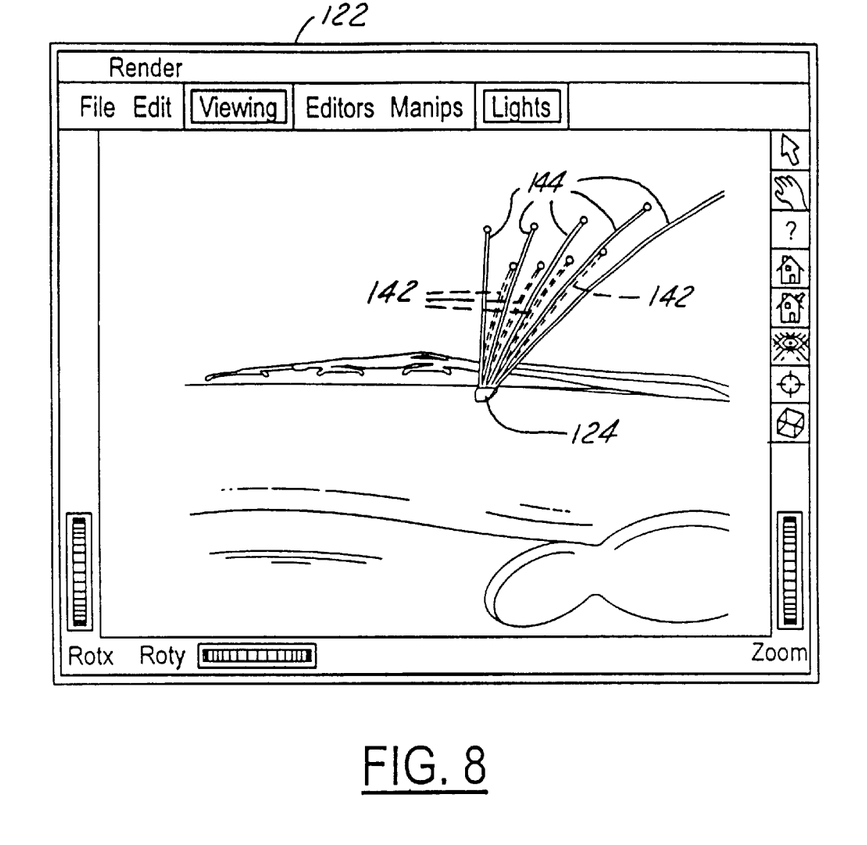
FIG. 8 is a screen view showing windshield washer spray trajectories and impact locations under both driving and parked conditions.
Figure 9:
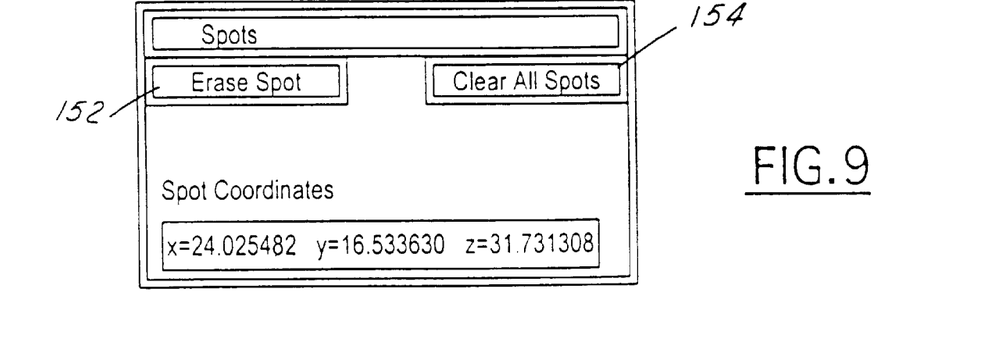
FIG. 9 is a screen view showing coordinates for selected impact spot location.

Returning to FIG. 2, the diamond 44 inquires whether the spray nozzle must be modified, and if so, flow is routed to box 34 where the just described processes of box 34 through box 42 are repeated with the modified spray nozzle information. If there is not a desire to modify the spray nozzle, then a user may request a new run in diamond 46. If a new run is chosen, the choice is made of picking a new vehicle in diamond 48 or changing the vehicle speed in box 50. If a new vehicle is chosen, flow is routed to box 30 and the process of boxes 30 through 42 are repeated. However, if a new vehicle is not chosen, then vehicle speed is changed in box 50 and flow is routed to box 32 and the processes in boxes 34 through 42 are repeated. It should be understood that both a new vehicle and a change in speed may be selected if a new run is desired. It should also be understood that the quarter of the individual process steps in FIG. 2 may be altered, and that some of the steps may be individually altered or deleted without departing from the invention.

In a second embodiment of the invention, trajectories of particles as they move on a vehicle surface under the influence of aerodynamic drag, inertia and gravity forces is displayed relative to the vehicle surface in order to assess particle movement therealong. The governing equations for embodiment are essentially the same as those described above with reference to the windshield washer spray nozzle trajectories with minor modifications, particularly a component of the gravity vector must be determined, which is tangential to the vehicle surface. The requirement that the simulated particles stay on the vehicle surface presents a challenge due to the face that the vehicle surface is not an analytical surface but rather a triangular mesh consisting typically of 100,000 triangles or more. Coordinates of the vertices of this mesh, connectivity information of the mesh, as well as surface velocity components at each vertex is contained in a file for use with the method and system of the present invention. Velocities at an interior of the mesh triangles is preferably obtained by interpolation. Given a point (x, y, z) on a triangle, the component of the gravity vector tangent to the triangle is the projection along the normal onto the plane of the triangle.

Unlike the windshield washer spray nozzle, an initial location in velocity of the particles is not specified but merely the number of particles. The program then selects the designated number of triangles from the mesh to represent the particles. Each particle is then simulated to have been released from the centroid of its triangle and particle track calculations proceed as follows: first, equation (2) is rewritten in terms of surface of surface coordinates of the starting triangle. This equation is then integrated in time for one time step. It is then determined if the particle is still on the same triangle or not. If it is, the equation is integrated for one additional time step. If the particle is not on the same triangle after a given time step, then a search is made through a list of neighboring triangles to determine which triangle the particle is one. Equation (2) is again rewritten in terms of the new surface coordinates of the new triangle and the calculations previously described herein are repeated until additional neighboring triangles cannot be found. The calculations will also be stopped if the quality of the triangle is poor or if the triangle already has streamlines passing through it.

Figure 10:
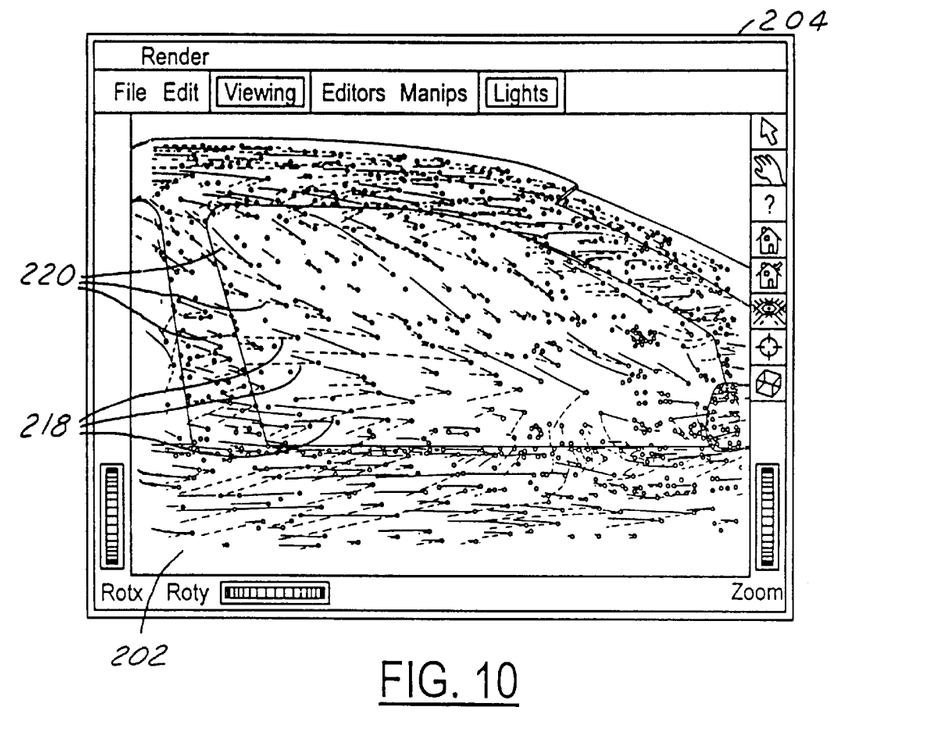
FIG. 10 is a screen view showing cropping controls for use with a second embodiment of the method and system of the present invention.
Figure 11:
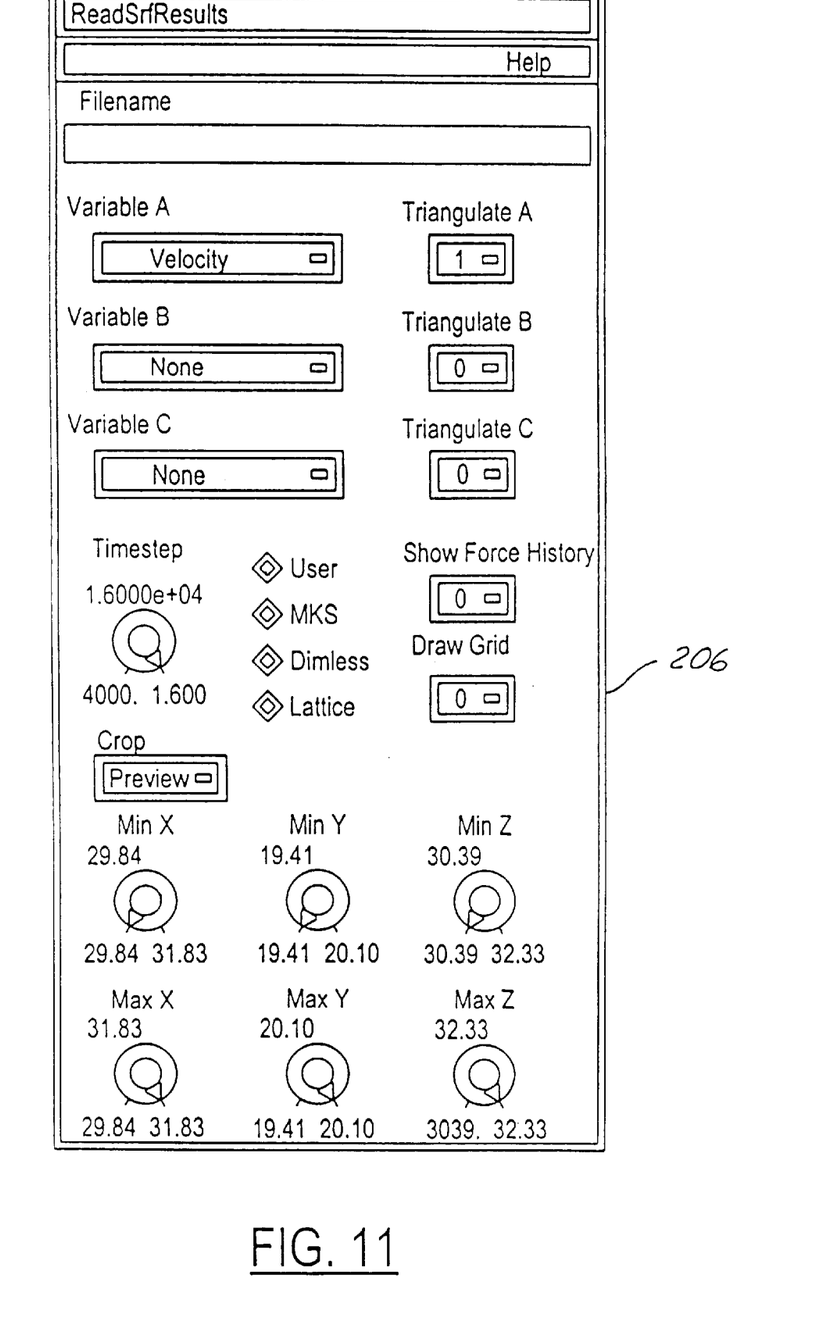
FIG. 11 is a screen view of a dialog box for the second embodiment.
Figure 12:
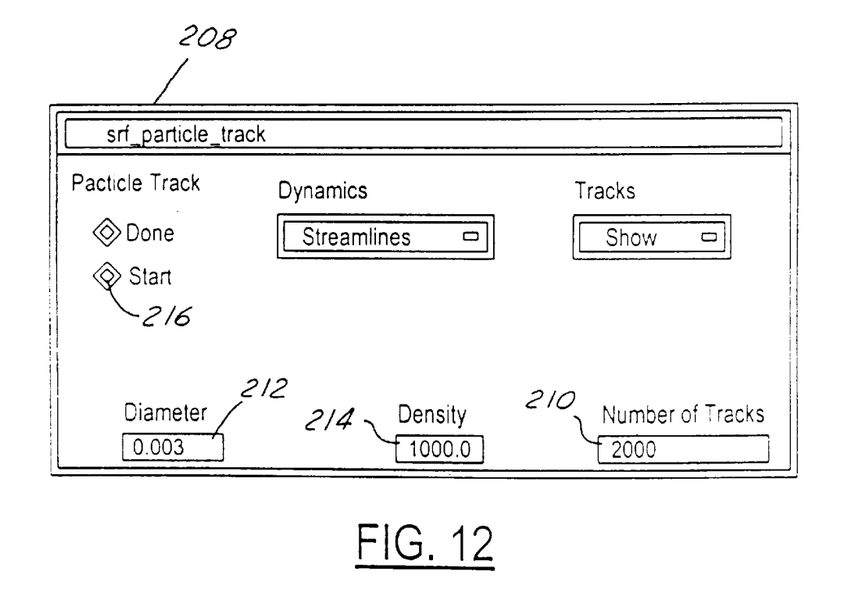
FIG. 12 is a screen view of a surface portion of a vehicle CAD model showing particle trajectories resulting from flow therealong.

As with the spray nozzle embodiment, a CAD model of the vehicle 202 is read into the computer memory and rendered in screen 204 (FIG. 10). After the data is loaded and rendered, a box appears (not shown) as described above, showing the region in which data is available. A user can crop the data through controls in a cropping screen 206 (FIG. 11) in a fashion similar to that described above. The particle information is then specified into the main dialog window 208 (FIG. 12), particularly by indicating the number of tracks 210, the particle diameter 212 and the particle density 214. Particle trajectories and tracks along the surface of the vehicle can then be computed by clicking on the start button 216 so that the computations described above begin. Preferably the program displays two types of tracks, including streamlines 218 which represent tracks of massless particles and actual tracks 220 which include the effects of inertia, gravity, and aerodynamic drag (FIG. 10). Preferably, the streamlines 218 and actual tracks 220 are displayed in different colors to permit easy visual differentiation therebetween.

Figure 13:
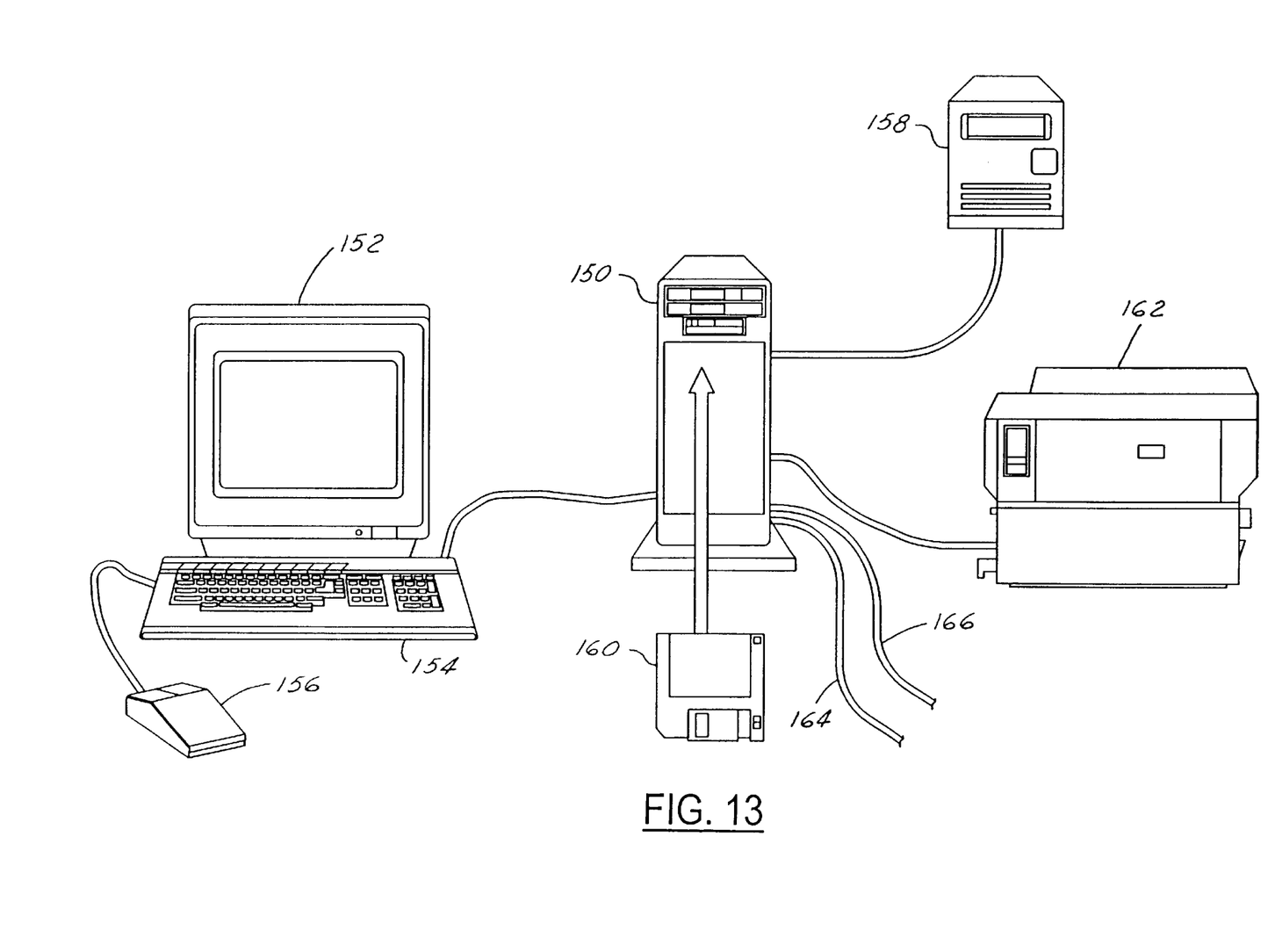
FIG. 13 is a perspective view of a system according to the present invention.

A representative computer system for the trajectory analysis method and system according to the present invention is depicted in FIG. 13. The system includes a processing unit 150 connected to a user interface which may include a display terminal 152, a keyboard 154, a pointing device, such as a mouse, 156, and the like. The processing unit 150 preferably includes a central processing unit, a memory, and stored instructions which implement a method to assist in vehicle design according to the present invention. The stored instructions may be stored within the processing unit 150 in the memory, or in any non-volatile storage such as magnetic or optical media, EPROM, EEPROM, or the like. Alternatively, instructions may be loaded from removal magnetic media 160, such as a removal disk, sometimes called a floppy disk, optical media 158, or the like. In a preferred embodiment, the system includes a general purpose computer program to implement the functions illustrated and described with reference to FIGS. 1–12. Of course, a system according to the present invention could also be embodied with a dedicated device which includes various combinations of hardware and software. The preferred embodiment may also include a printer 162 connected to the processing unit 150, as well as a network connection for accessing a local server, an intranet 164, and the Internet 166.

In a preferred embodiment, the present invention includes an arithmetic logic circuit configured to retrieve information from a specific file, display that information in a form of a vehicle design on a display screen, compute particle trajectories relative to the vehicle design based on specific input, display the trajectories relative to the vehicle design, and allow the user to modify the specific input in order to produce trajectories which meet the desired design criteria.

Although the preferred embodiment of the present invention has been disclosed, various changes and modifications may be made without departing from the scope of the invention as set forth in the appended claims.

What is claimed is:

1. A system for designing an automotive vehicle by enabling dynamic placement of particle injection points into a flow domain to permit visual observation and alteration of resulting particle trajectories under a computed flow solution over a computer aided design (CAD) model representative of a desired portion of the vehicle represented on a display means by a computer having memory means, processor means and user input means associated therewith, the system comprising:

particle injector placement code means, including stone injector code means for simulating ejection of particles from a predetermined tire patch of a tire of the CAD vehicle, operable with the user input means to dynamically effect a desired placement of at least one particle injector on the display means with respect to the desired portion of the CAD model;

trajectory determination code means for computing at least one trajectory for a particle stream emanating from at least one particle injector relative to the desired portion of the CAD model for a predetermined set of particle characteristics in a predetermined set of particle external conditions; and trajectory display code means for effecting display of the at least one trajectory with respect to the desired portion of the CAD model.

2. The system of claim 1 wherein the particle injector placement code means includes GUI means for displaying a particle injector GUI on the display means, the GUI means operative with the input means for locating the desired placement of the at least one particle injector.

3. The system of claim 1 wherein the predetermined set of particle characteristics includes at least one of a set of particle diameter data, particle density data, and particle initial velocity data.

4. The system of claim 1 wherein the trajectory display code means includes code means for displaying coordinate information on the display means relative to the CAD model for intersection of the at least one trajectory with the desired portion of the vehicle.

* * * * *